July 11, 1950 W. H. CLEMENT 2,514,843
LOADING AND UNLOADING TRUCK ATTACHMENT
Filed Oct. 22, 1948 2 Sheets-Sheet 1
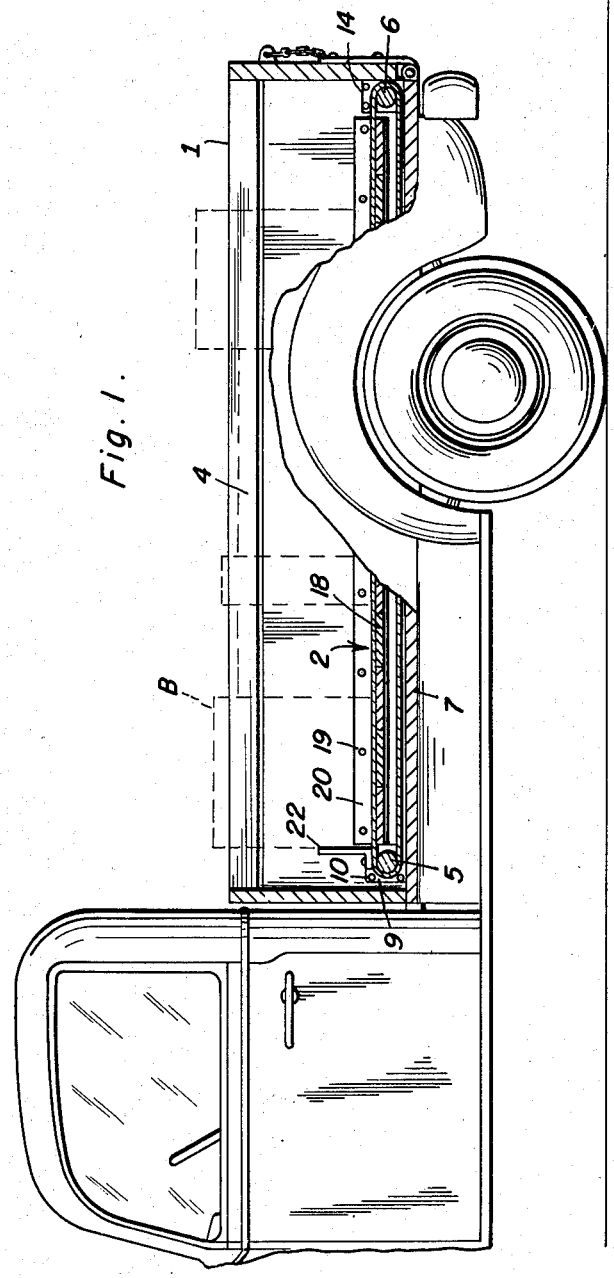
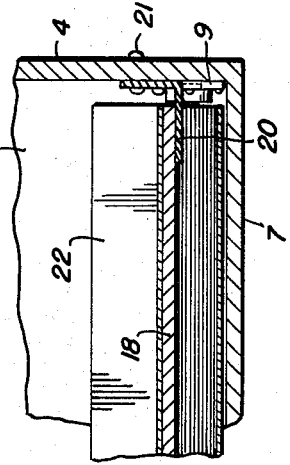
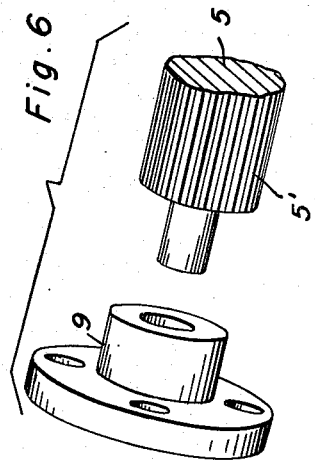
William H. Clement
INVENTOR.

July 11, 1950  W. H. CLEMENT  2,514,843
LOADING AND UNLOADING TRUCK ATTACHMENT
Filed Oct. 22, 1948  2 Sheets-Sheet 2
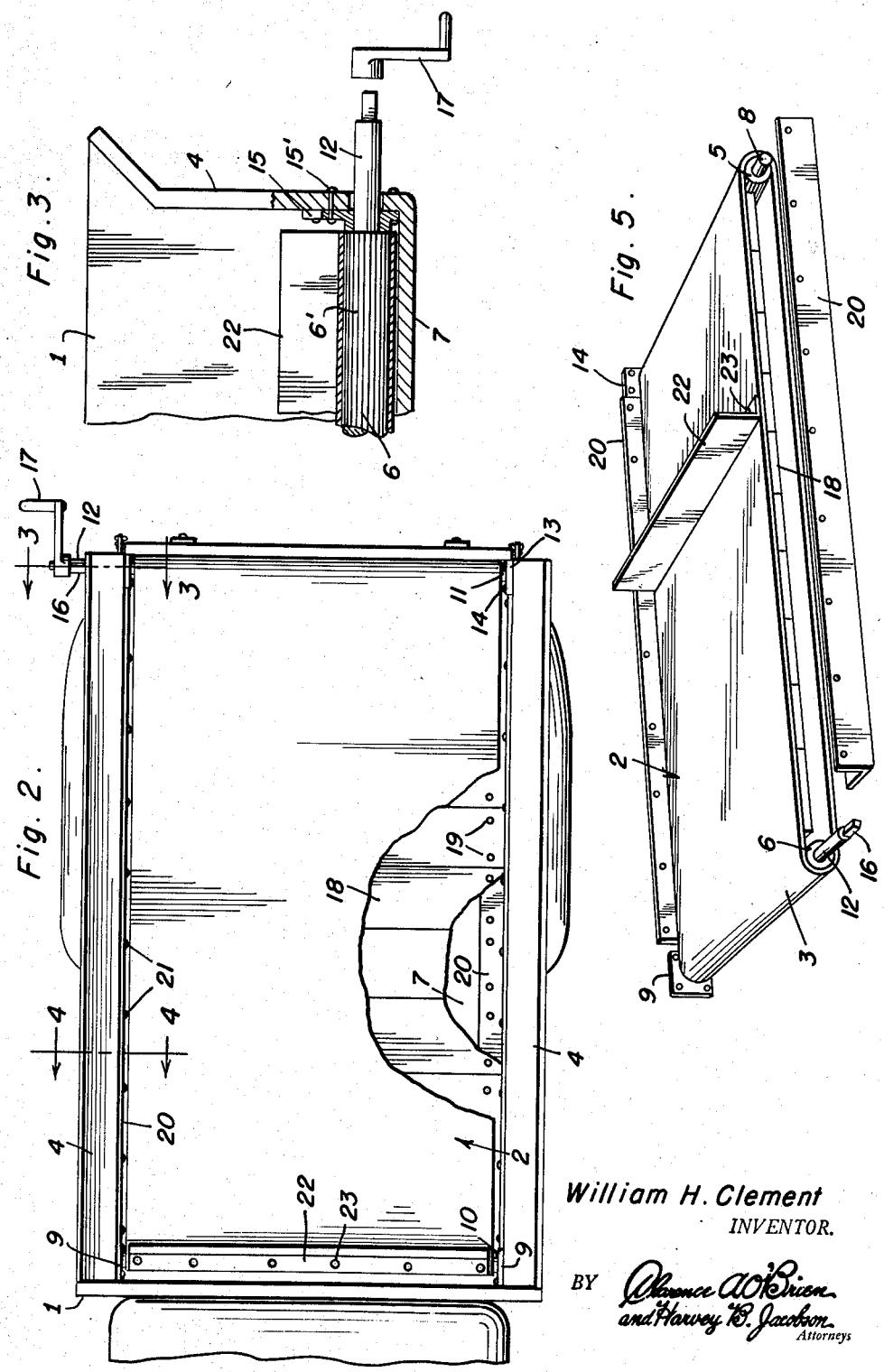
William H. Clement
INVENTOR.

Patented July 11, 1950

2,514,843

UNITED STATES PATENT OFFICE 2,514,843

LOADING AND UNLOADING TRUCK ATTACHMENT

William H. Clement, Spartanburg, S. C.

Application October 22, 1948, Serial No. 55,914

1 Claim. (Cl. 214—83.22)

My invention relates to improvements in loading and unloading apparatus for automotive trucks, and the like.

The primary object of the invention is to provide a simply constructed, inexpensive, labor-saving apparatus for installation in the bottom of a truck body, without altering the body, and whereby packages, boxes, crates, and the like may be easily loaded into and unloaded out of the body from the tail end thereof, by a person standing at said end.

Another object is to provide an apparatus of the character and for the purpose set forth which will withstand heavy duty operation and require a minimum of servicing.

Other and subordinate objects, within the purview of my invention, together with the precise nature of my improvements will be readily understood when the succeeding description and claim are read with reference to the drawings accompanying and forming part of this specification.

In said drawings:

Figure 1 is a fragmentary view partly in side elevation and partly in longitudinal section illustrating my invention in a preferred embodiment thereof;

Figure 2 is a view in plan of the same partly broken away;

Figure 3 is a view in vertical transverse section taken on the line 3—3 of Figure 2;

Figure 4 is a similar view taken on a line 4—4 of Figure 2;

Figure 5 is a view in perspective of the invention partly disassembled;

Figure 6 is a view in perspective illustrating one of the cap bearings and one of the rollers partly shown in section, the bearing and the roller being disassembled.

Referring to the drawings, by numerals, according to my invention, as illustrated, the usual automotive truck body 1, of the open top type as illustrated, is provided in the bottom thereof with an endless conveyor 2 for conveying articles, or merchandise, such as boxes B, shown in broken lines, longitudinally of said body 1 from end to end thereof.

The conveyor 2 comprises an endless apron 3 fitting, with a slight clearance, between the sides 4 of the body 1. The endless apron 3 is trained taut around a pair of front and rear transverse rollers 5, 6 adjacent the front and rear ends of the body 1 respectively, and supporting said apron 3 with its lower run just clear of the bottom 7 of said body. The front roller 5 has reduced journaled ends 8 rotating in a pair of cap bearings 9 bolted, as at 10, to the sides 4 of the body 1. The rear roller 6 has similar reduced journaled ends 11, 12, the end 11 being journaled in a cap bearing 13 bolted, as at 14, to the left side 4 of the body 1 and the end 12 being journaled through a sleeve bearing 15 bolted to the right side 4 of the body 1, as at 15'. The end 12 of the rear roller 6 extends out of the sleeve bearing 15 and through the right side 4 of the body 1 and is squared, as at 16, to accommodate a removable hand crank 17 for operating said roller. Both rollers 5, 6 are corrugated, or otherwise roughened, as at 5', 6' to grip the apron 3.

A platform support 18 underlies the top run of the apron 3 between said rollers 5, 6 to prevent the run from sagging and is preferably formed of planks extending transversely of the body 1 and apron 3 with ends bolted, as at 19, in a pair of supporting angle iron bars 20 extending between the rollers 5, 6 along the sides 4 of the body 1 and being bolted to said sides, as at 21.

A single pusher bar 22 of angle iron form extends across the upper runs of the apron 3 and is riveted thereto, as at 23.

In operating the described apparatus for loading from the rear end of the body 1, the rear roller 6 is rotated by means of the hand crank 17 to cause the top run of the apron 3 to travel forwardly and correspondingly convey, towards the front end of the body 1, boxes B, or the like, placed on said run from the rear end of said body behind the pusher bar 22. The boxes B, or the like, may be deposited on the top run of the apron 3 until the pusher bar 22 abuts the front end of the body 1. This prevents damage to the first loaded boxes and advises that the conveyor 3 has reached its limit of loading movement. In unloading, the direction of operation of the apron 3 is reversed and the pusher bar 22 pushes the boxes B, or the like, rearwardly to the rear end of the body 1 for manual handling, or dumping, as may be required. The weight of the boxes B, or other load, is sustained by the platform support 18, the advantage of which will be clear.

The foregoing will, it is believed, suffice to impart a clear understanding of my invention, without further explanation.

Manifestly, the invention, as described, is susceptible of modification, without departing from the inventive concept and right is herein reserved to such modification as fall within the scope of the appended claim.

Having described the invention, what is claimed as new is:

Loading and unloading apparatus for use in a flat bottom truck body comprising an endless flexible conveyor apron extending horizontally in said body from end to end and side-to-side thereof to provide a top run for conveying a load forwardly or rearwardly of said body and a bottom run spaced close to said flat bottom and protected beneath the same by said flat bottom, a transverse pusher bar on said top run for pushing a load imposed on said run, a pair of transverse corrugated rollers at opposite ends of said body for supporting said apron in frictional engagement therewith, means for operating one roller to cause said top run to travel forwardly or rearwardly, a platform support under said top run extending substantially from side to side of said body and substantially from one roller to the other, and means to fasten said platform to said body, said pusher bar being engageable with one end of said body to establish a starting position for said apron in unloading.

WILLIAM H. CLEMENT.

REFERENCES CITED

The following references are of record in the file of this patent:

UNITED STATES PATENTS

| Number | Name | Date |
|---|---|---|
| 507,122 | Harrington | Oct. 24, 1893 |
| 1,081,697 | Renney et al. | Dec. 16, 1913 |
| 2,138,893 | Wallace | Dec. 6, 1938 |
| 2,140,974 | Wagner et al. | Dec. 20, 1938 |
| 2,281,120 | Stargardt | Apr. 28, 1942 |
| 2,345,328 | Conway et al. | Mar. 28, 1944 |